United States Patent [19]
Gammino

[11] Patent Number: 5,809,125
[45] Date of Patent: Sep. 15, 1998

[54] METHOD AND APPARATUS FOR INTERCEPTING POTENTIALLY FRAUDULENT TELEPHONE CALLS

[76] Inventor: John R. Gammino, 6 E. Point Rd., Lincroft, N.J. 07738

[21] Appl. No.: 186,820

[22] Filed: Jan. 25, 1994

Related U.S. Application Data

[63] Continuation of Ser. No. 911,115, Jul. 9, 1992, abandoned.

[51] Int. Cl.⁶ .................................................. H04M 3/38
[52] U.S. Cl. ..................... 379/189; 379/200; 379/196; 379/199
[58] Field of Search ..................... 379/189, 194, 379/200, 91, 143, 144, 145, 161, 168, 198, 112

[56] References Cited

U.S. PATENT DOCUMENTS

| | | | |
|---|---|---|---|
| 3,761,634 | 9/1973 | Sobanski et al. | 379/189 |
| 4,012,602 | 3/1977 | Jackson | 379/200 |
| 4,188,508 | 2/1980 | Rogers et al. | 379/189 |
| 4,332,982 | 6/1982 | Thomas | 379/200 |
| 4,358,640 | 11/1982 | Murray | 379/200 |
| 4,425,480 | 1/1984 | Lischin | 379/200 |
| 4,481,384 | 11/1984 | Matthews | 374/198 |
| 4,511,765 | 4/1985 | Kuo | 379/190 |
| 4,577,066 | 3/1986 | Bimonte et al. | 379/221 |
| 4,761,808 | 8/1988 | Howard | 379/112 |
| 4,782,516 | 11/1988 | Maybach et al. | 379/189 |
| 4,794,642 | 12/1988 | Arbabzadah et al. | 379/200 |
| 4,833,707 | 5/1989 | Serret, Jr. | 379/200 |
| 4,866,762 | 9/1989 | Pintar | 379/200 |
| 4,933,965 | 6/1990 | Hird et al. | 379/112 |
| 4,953,202 | 8/1990 | Newell | 379/200 |
| 4,965,459 | 10/1990 | Murray | 379/189 |
| 4,993,062 | 2/1991 | Dula et al. | 379/88 |
| 5,109,408 | 4/1992 | Greenspan et al. | 379/197 |
| 5,566,234 | 10/1996 | Reed et al. | 379/188 |

FOREIGN PATENT DOCUMENTS

| | | | |
|---|---|---|---|
| 2830281 | 1/1980 | Germany | 379/200 |
| 5-167673(A) | 7/1993 | Japan | 379/200 |
| 2211695 | 7/1989 | United Kingdom | 379/200 |

OTHER PUBLICATIONS

Worldwide Videotex Article Titled "Fraud Protection Must Accompany 10XXX Unblocking" V.3, No. 11>T, Nov. 1991.

Worldwide Videotex Article Titled "10XXX Unblocking Deadline Financially Fatal to Payphone Owners" V.3, No. 2, Feb. 1992.

(List continued on next page.)

*Primary Examiner*—Ahmad F. Matar
*Attorney, Agent, or Firm*—Ratner & Prestia

[57] ABSTRACT

Potentially fraudulent telephone calls are intercepted from public telephones. As the digits which correspond to a telephone number are entered into a telecommunications device, each number at a particular location is compared with a predetermined number. If, according to this comparison, telephone numbers which include certain digits at particular locations in the dialing sequence are entered, the telephone call is blocked. This technique may be implemented by including appropriate software into a microprocessor controlled public telephone. For public telephones which are not microprocessor controlled, a microprocessor driven system can be interposed between the public telephone and the telecommunications line. A similar algorithm can be implemented in conjunction with a PBX system. When a PBX system is being accessed from a public telephone in order to establish a telephone call using the PBX outgoing lines, the telephone numbers which are entered into the PBX can be compared with predetermined number sequences in the manner described above. A warning signal can be generated or the call can be blocked if particular dialing sequences are entered. Velocity checking can also be implemented on any of the above systems in order to detect potentially fraudulent telephone calls.

49 Claims, 8 Drawing Sheets

OTHER PUBLICATIONS

FCC 96–131 Docket (In the Matter of Policies and Rules Concerning Operator Service Access and Pay Telephone Compensation), Released Apr., 5, 1996.

"The Brave New World of Toll Fraud", Rural Telecommunications Journal, (Mar. 92), vol. 11, No. 2, pp. 14–20 by David Bolton.

"NATA Official: Phone Companies 'Not Doing Their Job' About Fraud" Voice Technology News, (Jun. 30, 92), vol. 4, No. 13.

"Most RHCs Want to Halt FCC Effort to Impose International Call Blocking", Communications Daily (Mar. 13, 1993).

"American Public Communications Council (APCC) Has Asked FCC", Common Carrier Week (Jan. 13, 1992).

Newsletter Published by Capitol Publications, Inc. Intelligent Network News (14 May 92) vol. 4, No. 9 Entitled Independent SS7 Network Growth Predicted.

TCI Catalog for TC–1013SL "Programmable Call Controller" for Selective Call Control © 1990.

METHOD AND APPARATUS FOR INTERCEPTING POTENTIALLY FRAUDULENT TELEPHONE CALLS

This application is a continuation of application Ser. No. 07/911,115 filed Jul. 9, 1992 now abandoned.

FIELD OF THE INVENTION

The present invention relates to telecommunications and more specifically to the selective disablement of telecommunication devices. In particular, a method and apparatus is disclosed for monitoring a sequence of digits input to a telecommunication device and selectively disabling the telecommunication device if particular digits are detected at defined locations in the sequence.

BACKGROUND OF THE INVENTION

A common method for placing a call with a telecommunications device (e.g. a pay telephone) is through the use of calling card numbers. A calling card number is a sequence of digits which may be used as input to a telecommunications device by a telecommunications user. By entering a calling card number, the cost of a subsequently placed call may be charged to a calling card account. The charges which accrue on a particular calling card account then become the responsibility of the calling card account holder (e.g. a particular individual or corporation). In this manner, one can use a pay telephone without inserting coins into that device.

If a telecommunications company receives a valid sequence of digits when calling card number entry is requested, the call is allowed to complete. Conversely, if the telecommunications company receives an invalid sequence of digits when calling card number entry is requested, the call is not allowed to complete. Thus, the security in the use of a calling card number lies in the confidentiality of that number. In other words, by not divulging one's calling card number, unauthorized use of the calling card account is effectively prevented.

Using the United States as an exemplary origination point, a caller could bill a telephone call to a calling card account from a public telephone by simply dialing the international access code (e.g. 011 or 01) followed by the country code, the city code and the number of the party being called. The caller would then receive a tone. He would then enter the numbers of the calling card into the telephone. This may be accomplished, for example, by pressing appropriate push buttons on a DTMF keypad.

An alternative way to place calls using a telecommunications device is through the use of night answer and automated voice response systems. By entering a series of digits which call one of these systems, "entry" into the system is obtained. Then, by entering additional digits (e.g. an access code), the system may be directed to place a telephone call to anywhere in the world. The owner of the system (e.g. a corporation) is billed for the cost of any call which is completed by the system. An exemplary system of this type is described in U.S. Pat. No. 4,747,124 entitled "PBX TELEPHONE CALL CONTROL SYSTEM" which is incorporated by reference for its teachings in the field of automated voice response systems. Again, the security in preventing unauthorized use of such a system lies in maintaining the confidentiality of any access codes which enable system operation.

Although the methods described above appear to be secure, there are several ways in which unauthorized calls can be made using such systems. Calling card numbers may be stolen, for example, by watching an unsuspecting user enter the numbers. Until the theft has been discovered and the account cancelled, these numbers can be used by the observer to fraudulently place phone calls. The calling card account holder is then charged for the cost of the calls. By using stolen calling card numbers in this manner, it is possible to fraudulently place many international calls which originate from the United States.

Similarly, fraudulent calls may be placed using night answer and automated voice response systems. Again, security digits, unknowingly obtained by a thief, can be entered into a telephone key pad in order to signal a night answer or automated voice response system to place a long distance or international call. In this manner, the owner of the corporation is automatically billed for the cost of such a call without the corporation's consent.

One solution which minimizes fraudulent calls from public telephones is to block number sequences which access international telecommunications services. Such services are often accessed from public telephones by initially entering the digit sequence 01. Furthermore, recent legislation in the United States has provided a variety of alternative codes for placing international calls. Exemplary codes include 10xxx, 950, and 1-800.

In addition to accessing international telecommunications services, the codes set forth above may be used for accessing long distance services (e.g. interstate calls). Current United States law prevents the blockage of interstate calls from public telephones when these calls are placed using certain access codes. Thus, although the blockage of calls based solely on the detection of the number sequences specified above would prevent access to international telecommunications services, the blockage of calls based solely on the detection of the number sequences specified above would be unlawful, because interstate calls would be blocked as well.

Additional access codes may be created in the future for accessing long distance and/or international telecommunication services. Future United States law may prevent the blocking of these future created codes.

SUMMARY OF THE INVENTION

The present invention relates to a method and apparatus for intercepting potentially fraudulent telephone calls which originate with a dialing sequence which includes a first plurality of dialing digits followed by a second plurality of dialing digits followed by a third plurality of dialing digits. The call is blocked if the first plurality of dialing digits and the third plurality of dialing digits are determined to be respective predetermined digits.

DETAILED DESCRIPTION

Figure 1A:
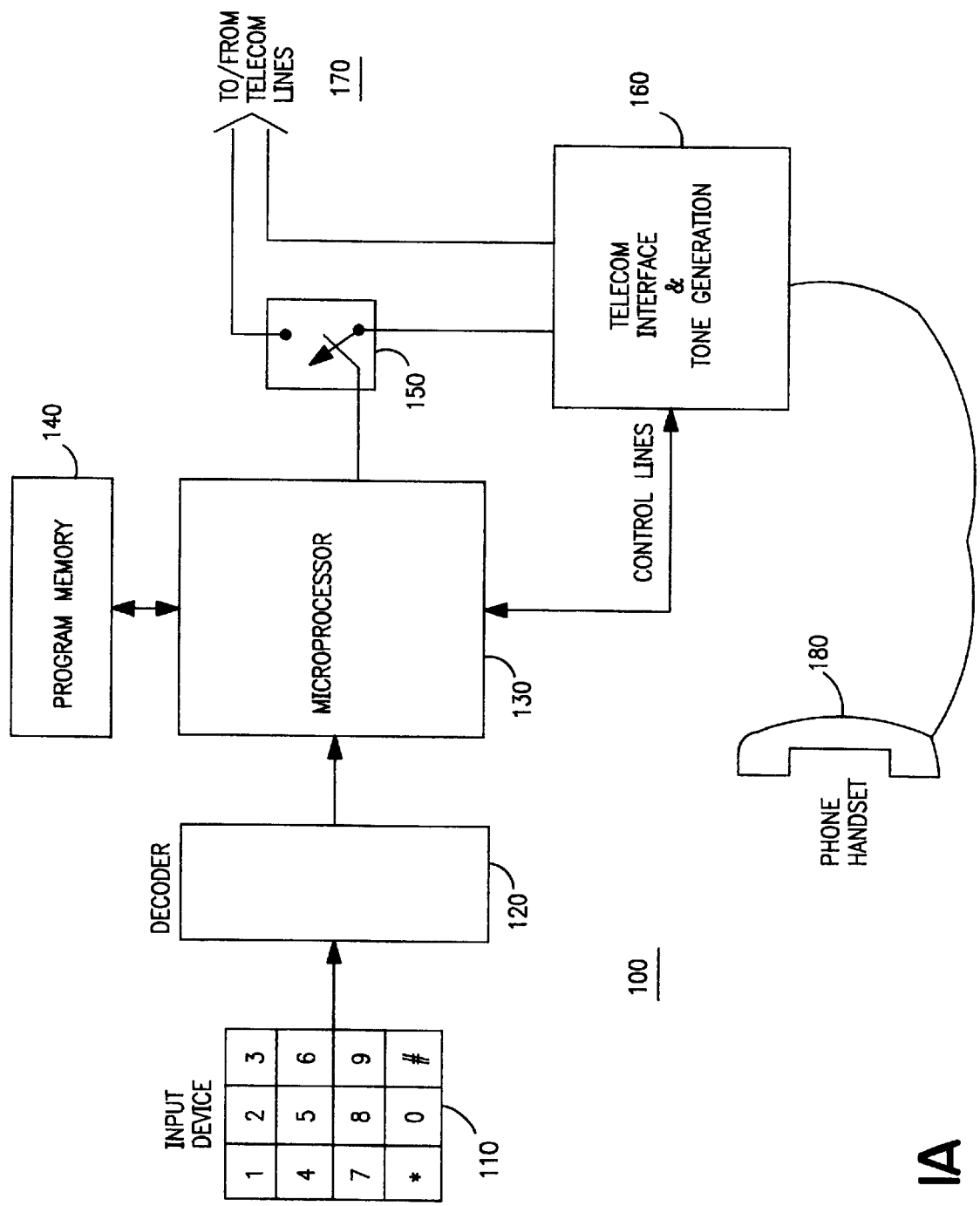
FIG. 1A is a block diagram which illustrates a first exemplary embodiment of the present invention.

A first exemplary embodiment of the present invention is illustrated in FIG. 1A. As shown in FIG. 1A, a telecommunications device 100 is coupled to telecommunication lines 170 through telecommunication interface and tone generation circuitry 160. In an exemplary embodiment of the present invention, item 160 includes semiconductor device TP5088 (manufactured by National Semiconductor Corporation). Furthermore, the telecommunications interface may be implemented using circuit configurations which are well known to one skilled in the art of designing telecommunications systems.

Telecommunication line 170 may be used for a variety of different functions, for example, for interfacing to any type of commercial telephone network. Alternately, telecommunications line 170 may be used for interfacing to any type of private network including, but not limited to, government or corporate owned networks. Furthermore, telecommunications line 170 may be used for interfacing to a limited access type network, for example, a telecommunications line which has been specifically identified by a central office (or an analogous switch) for dedicated use (e.g. pay telephone signalling protocols). Furthermore, telecommunications line 170 may be coupled to a variety of telephone networks (e.g. a cellular network). Thus, the invention may also be used for portable (including cellular) applications.

Switch 150 is located between telecommunication interface and tone generation circuitry 160 and telecommunication lines 170. By applying an appropriate control signal to switch 150, communications between telecommunications device 100 and telecommunications lines 170 can be effectively stopped. Switch 150 is shown disconnecting one of several connections between telecommunication interface and tone generation 160 and telecommunication lines 170. However, more than one switch (not shown) may be used so as to disconnect each connection between telecommunication interface and tone generation circuitry 160 and telecommunications lines 170.

The control signal which is received by switch 150 originates from microprocessor 130. In an exemplary embodiment of the present invention, microprocessor 130 may be a device such as a Z80 semiconductor device, 6800 semiconductor device, etc. Microprocessor 130 is coupled to program memory 140 in which appropriate routines for use by microprocessor 130 are stored. Exemplary programs for controlling the microprocessor 130 are described below with reference to FIGS. 4A, 4B and 4C.

As shown in FIG. 1A, input device 110 may be used for entering a plurality of digits into telecommunications device 100. Input device 110 is coupled to decoder 120. In an exemplary embodiment of the present invention, decoder 120 may be semiconductor device 74C923 manufactured by National Semiconductor Corporation. Each digit which is entered using input device 110 is detected by decoder 120. Decoder 120 transmits this information to microprocessor 130. Microprocessor 130 then transmits appropriate signals to telecommunication interface and tone generation 160.

In an exemplary embodiment of the present invention, a user enters a plurality of numbers using input device 110. Based on the particular digit sequence which is entered, microprocessor 130 directs telecommunication interface and tone generation 160 to produce appropriate DTMF tones. Assuming switch 150 is in the closed position, these tones are transmitted to telecommunication lines 170.

Furthermore, in an exemplary embodiment of the present invention, numbers are entered using a telephone keypad. However, it is contemplated that alternative methods for entering telephone digits may be used in order to produce appropriate tones from telecommunication interface and tone generation circuitry 160. For example, a desired number sequence may be entered using a traditional rotary device (not shown). Alternately, a digit sequence may be stored in an information medium (not shown) (e.g. a credit card magnetic stripe, a smart card, etc.). The telecommunications device may include a reader (not shown) which is capable of reading the digit sequence (e.g. from the magnetic medium, the smart card, etc.). Alternately, a digit sequence may be spoken by the user and then converted into appropriate electronic signals by voice recognition circuitry (not shown). Thus, it is understood that the digit sequence may be entered into telecommunications device 100 in a variety of ways.

Program memory 140 includes appropriate software routines in order to prevent the use of telecommunications device 100 if particular conditions are met. In particular, microprocessor 130 examines the sequence of digits which are entered by input device 110. If microprocessor 130 determines that particular digits have been entered at particular places in the dialing sequence, microprocessor 130 signals switch 150 to open, thus disconnecting the call. Such a determination may be performed, for example, by comparing the entered telephone number with a plurality of telephone numbers located in a table which is accessible to microprocessor 130. Table entries may include "don't care" values to indicate digits and locations in the dialing sequence which should not serve as a basis for preventing completion of the telephone call. These "don't care" values may be situated between two groups of dialing digits (each group including at least two dialing digits). Put another way, the don't care values (and their corresponding signal values) are interposed between a first group of dialing digits (i.e. first signal values) and a second group of dialing digits (i.e. second signal values). Each of these two groups of dialing digits are thus evaluated to determine if the call should be allowed to complete. For example, the first of the two groups of dialing digits (and their corresponding signal values) may be compared to first test signal values and the second of the two groups of dialing digits (and their corresponding signal values) may be compared to second test signal values to make this determination. Further "don't care" values may precede or succeed either or both of the two groups of dialing digits. Software to implement this algorithm is readily synthesized by one skilled in the art.

Exemplary "don't care" values which follow the second group of dialing digits may include a country code, a city code and a local number. This local number includes a central office exchange code which indicates an exchange area (i.e. one or several central offices) through which the call will proceed before reaching the destination subscriber. The use of this terminology is illustrated by a call to Paris: 33-1-local number. 33 is presently the country code and 1 is the city code. For calls to North America outside of the United States, the "don't care" values may simply contain a local number (i.e. without a country code and a city code).

Again, this telephone number will also include a central office exchange code to indicate the exchange area (or one or several central offices) through which the call will proceed before reaching the destination subscriber.

In an exemplary embodiment of the present invention, detection of one or more of the following digit sequences in the dialing sequence results in the blocking of a telephone call:

TABLE I

10XXX01
950XXXX01
1800XXXXXXX01

In addition, it is possible to block international calls which are accessed using a three digit area code. Exemplary international telephone numbers which result in a blocked call include:

TABLE II

950XXXX0809
1800XXXXXXX0809
10XXX0809

If entered into a telecommunications device which is not in accordance with the present invention, these particular sequences allow an individual who has fraudulently obtained a calling card number to place long distance or international calls without authorization. By blocking a telephone call when any of these exemplary digit sequences are entered, the unauthorized use of calling card numbers for long distance and international calls may be effectively prevented.

It is contemplated that additional numerical sequences may allow an individual to access long distance and international communication carriers. These numerical sequences include two or more predetermined digits which are located at particular places in the dialing sequence. The particular places where each of these digits is located may be at the beginning, the middle or the end of the dialing sequence. Furthermore, additional digits may be interposed between the predetermined digits. Microprocessor 130 (via program memory 140) can be programmed to detect when these digits have been entered, and to cause switch 150 to open upon detection of these digits.

Figure 1B:
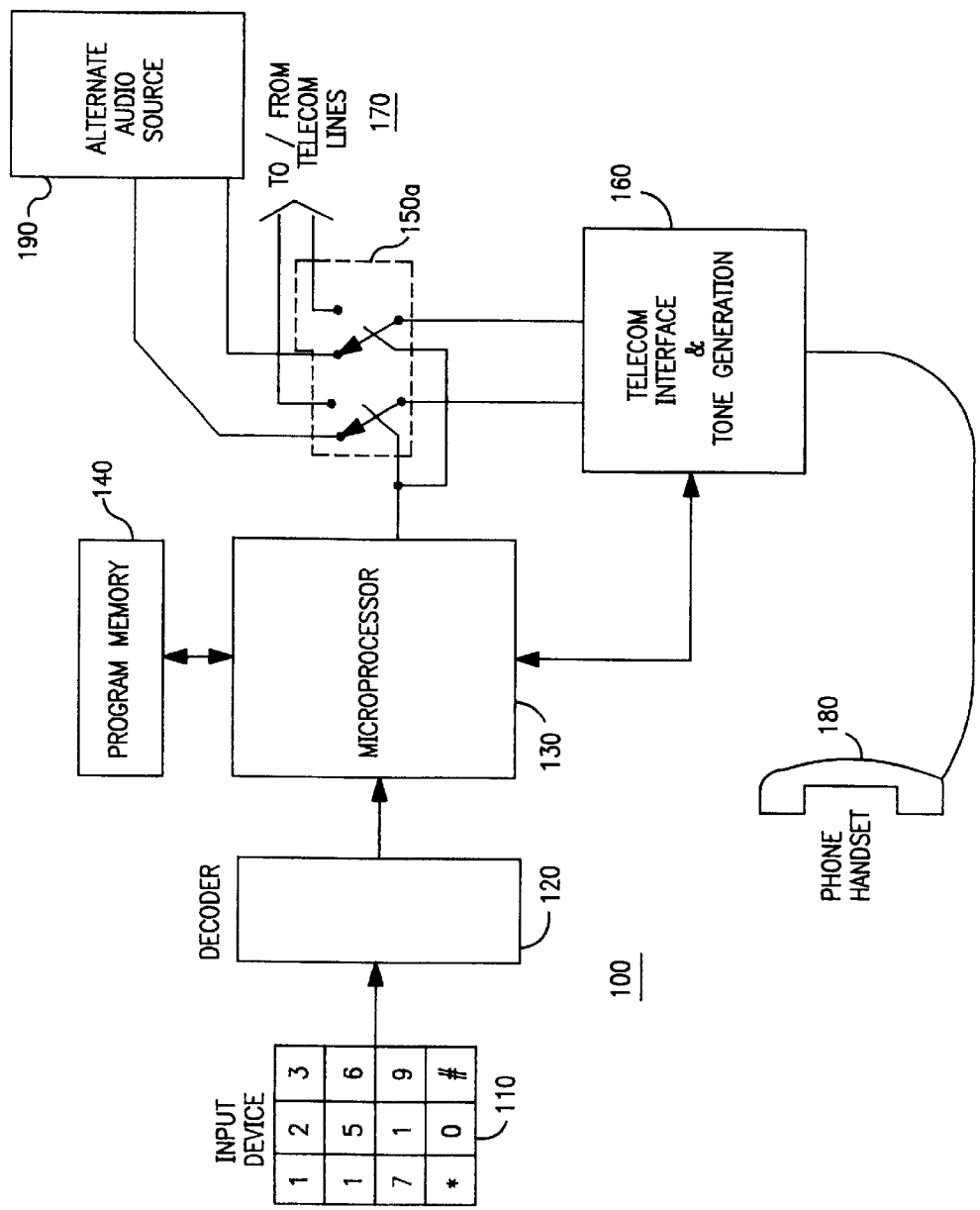
FIG. 1B is a block diagram which illustrates a second exemplary embodiment.

A further exemplary embodiment of the present invention is illustrated by FIG. 1B. FIG. 1B is similar to FIG. 1A. However, switch 150 has been replaced with switch 150A. Furthermore, switch 150A is connected to alternate audio source 190. The plurality of digits which are entered upon making a telephone call are examined, as in the exemplary embodiment which is illustrated by FIG. 1A. However, in the exemplary embodiment which is shown by FIG. 1B, when predetermined digits are located at particular locations in the dialing sequence, microprocessor 130 signals switch 150A to disconnect telecommunication interface and tone generation 160 from telecommunication lines 170. Furthermore, the signal which is transmitted from microprocessor 130 causes switch 150A to connect telecommunication interface and tone generation 160 to alternate audio source 190. Alternate audio source 190 may transmit a message to the telephone user, explaining to the user that a telephone call cannot be made from telephone unit 100 using the telephone number which has been entered.

In the embodiments of the present invention which are illustrated by FIGS. 1A and 1B, possibly fraudulent telephone calls can be handled by both embodiments in one of two ways. First, the telephone call can be terminated immediately upon detection of predetermined digits at particular places in the dialing stream. Thus, each digit in the dialed telephone number is transmitted to telecommunication line 170 as the digit is entered by the telephone user. Alternatively, as each digit is entered, it may be stored in microprocessor 130. In this instance, none of the dialed digits is transmitted to telecommunication line 170 until all of the digits in the dialed telephone number have been entered. If predetermined digits are detected at specified locations in the dialing sequence, then the entered telephone number is not transmitted to telecommunication line 170. Furthermore, as shown in the exemplary embodiment of the present invention which is illustrated by FIG. 1B, the telephone user may then receive a message from alternate audio source 190 indicating that the attempted telephone call will not be allowed to proceed. Alternately, if the predetermined digits are located, the call may be automatically routed to the police, to management of the installation containing the public telephone, or to a recording.

In a further exemplary embodiment of the present invention, switch 150 (of FIG. 1A) and switch 150A (of FIG. 1B) are not included. Thus, telecommunication interface and tone generation circuitry 160 is connected directly to telecommunication lines 170. Upon the detection of predetermined digits at particular places in the dialing sequence, the user is prevented from entering additional digits corresponding to a telephone number into telecommunications device 100. The user may be prevented from entering these further digits in several ways. For example, a signal from microprocessor 130 may disable input device 110. Alternately, microprocessor 130 may disable decoder 120. Microprocessor 130 may also be programmed to simply suspend all processing within telecommunications device 100 until a signal (such as an "on-hook" condition) is detected. In this manner, use of telecommunications device 100 is effectively suspended.

In FIGS. 1A and 1B, switches 150 and 150A are each shown as a physical switch. However, it is understood that switches 150 and 150A may be implemented as mechanical switches, electronic switches, etc. Furthermore, switches 150 and 150A may be constructed in a manner such that they are capable of achieving electrical isolation between different terminals associated with the switch, while appropriate physical connections are maintained.

Figure 2A:
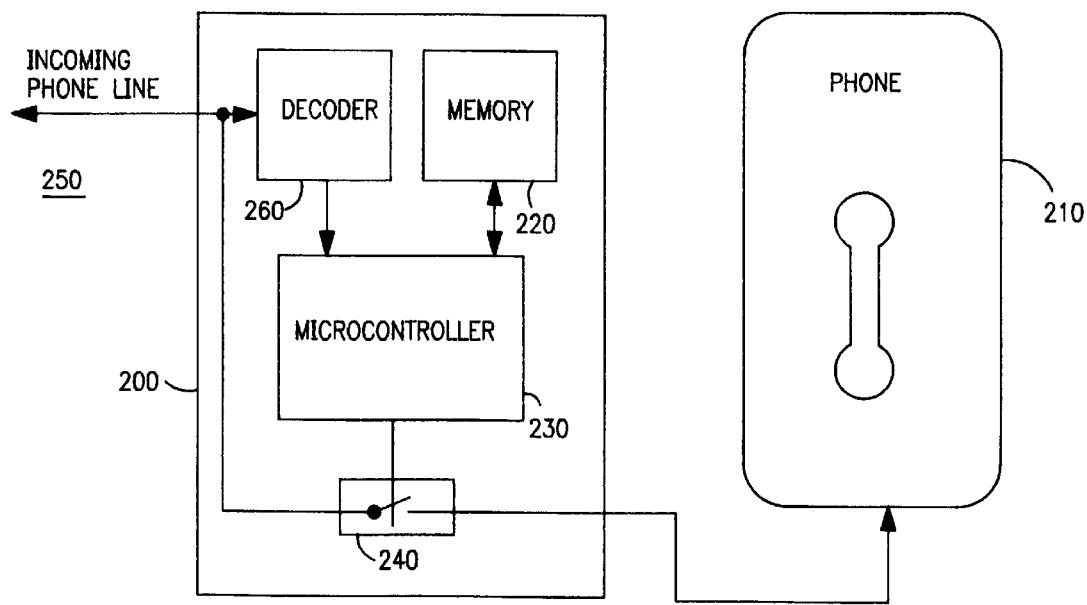
FIG. 2A is a block diagram which illustrates a third exemplary embodiment of the present invention.

A further exemplary embodiment of the present invention is illustrated by FIG. 2A. In FIG. 2A, telecommunications device 210 is connected to telecommunication lines 250 via interface unit 200. As in the exemplary embodiment to the present invention which is illustrated by Figure 1A, telecommunications line 250 may have a variety of different functions.

The exemplary embodiment which is illustrated by FIG. 2A includes microcontroller 230 which receives instructions from memory 220. Decoder/DTMF generator 260 receives a plurality of telephone numbers which are provided by telecommunications device 210. The telephone number sequence is converted to electrical signals which are transmitted to microcontroller 230. If microcontroller 230 detects that specific, predetermined digits have been entered at particular locations in the dialing sequence (as in the embodiment illustrated by FIG. 1A), microcontroller 230 may signal switch 240 to open. This causes a termination of the telephone call.

Although switch 240 is shown connected between telecommunications device 210 and tone converter 260, it is contemplated that switch 240 can be located anywhere between telecommunications device 210 and telecommunication lines 250 which would cause the telephone call to be terminated when the switch is opened.

Figure 2B:
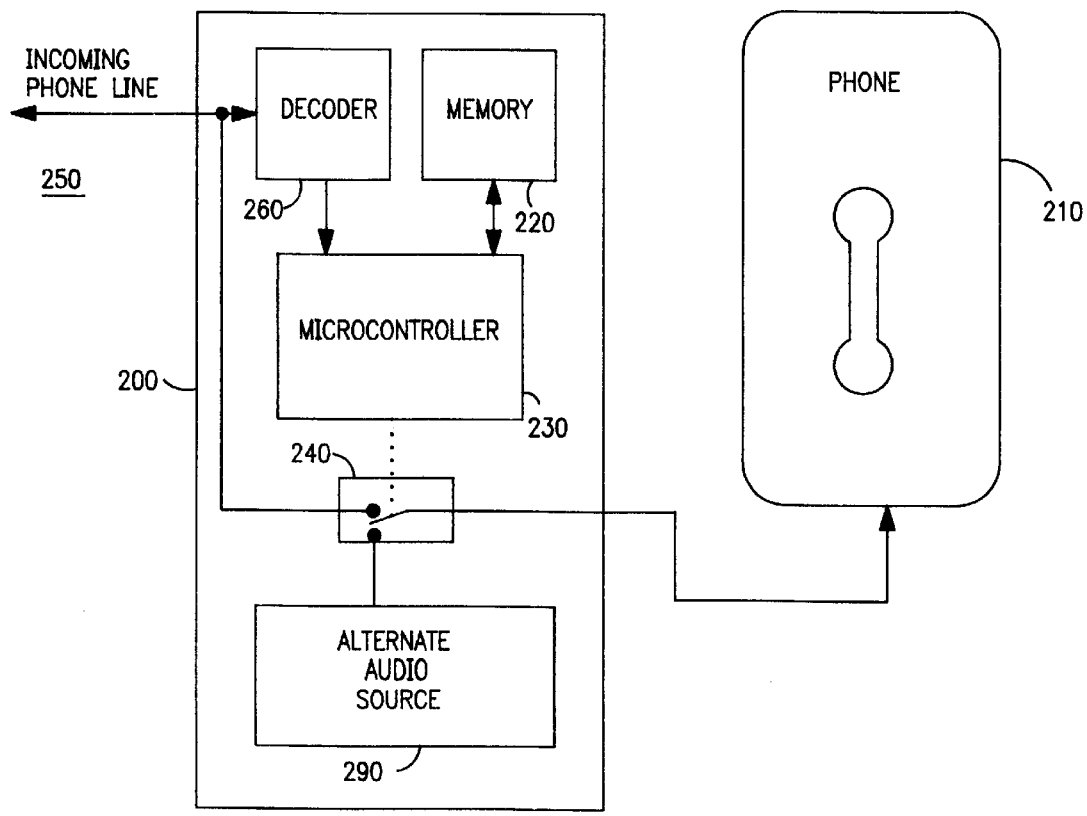
FIG. 2B is a block diagram which illustrates a fourth exemplary embodiment of the present invention.

A further exemplary embodiment to the present invention is illustrated by FIG. 2B. As shown in FIG. 2B, microcontroller 230 may determine that at least two predetermined digits have been entered at appropriate locations in the dialing sequence (as in the embodiment illustrated by FIG. 1A). Microcontroller 230 may then signal switch 240 to connect phone 210 to alternate audio source 290. In this manner, a message is transmitted from alternate audio source 290 to phone 210 which indicates that the attempted telephone call is not allowed.

The exemplary embodiments of the present invention which are illustrated by FIG. 2A and 2B may have various features which are included in the exemplary embodiments which are illustrated by FIGS. 1A and 1B. One skilled in the art could readily implement any of the features which are illustrated by FIGS. 1A and 1B into the embodiments which are illustrated by FIGS. 2A and 2B.

Figure 2C:
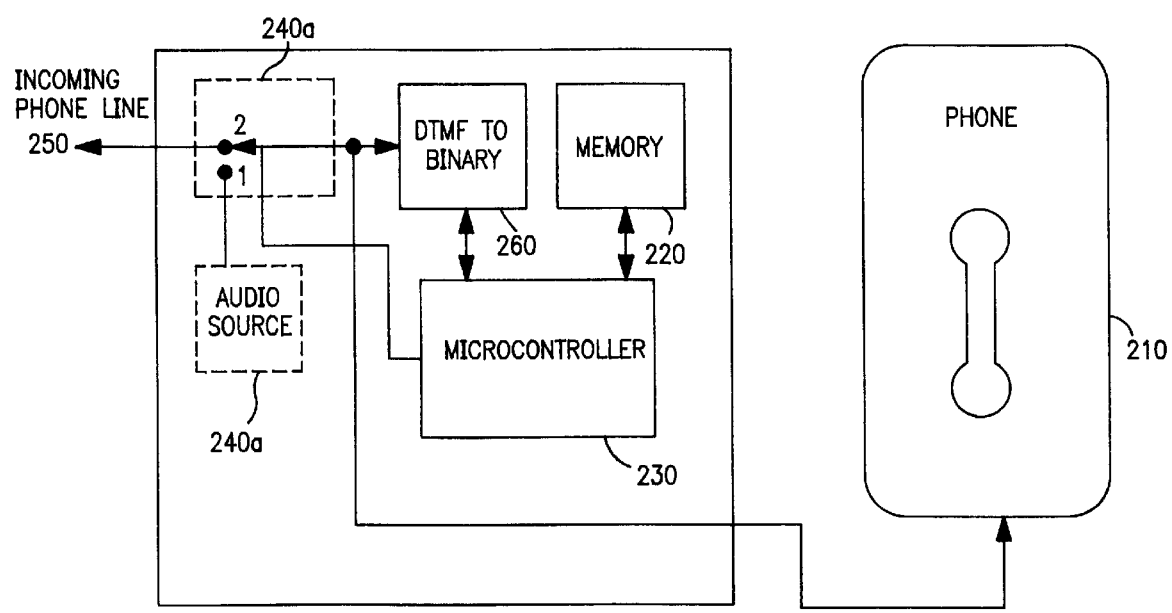
FIG. 2C is a block diagram which illustrates a fifth exemplary embodiment of the present invention.

A further exemplary embodiment of the present invention is illustrated by FIG. 2C. In this exemplary embodiment, switch 240A can be maintained in position 2 until microcontroller 230 determines that predetermined digits have been entered at specified locations in the dialing sequence (as in the embodiment illustrated by FIG. 1A). If this occurs, switch 240A can be moved to position 1. Audio source 290A is optionally included. If audio source 290A is included, a message can be transmitted to the user of phone 210 when microcontroller 230 places switch 240A into position 1.

Alternately, switch 240A can be maintained in position 1 while the number is entered from telephone 210. After all of the digits have been entered and microcontroller 230 has determined that a valid telephone number has been entered, switch 240A can be moved to position 2. Microcontroller 230, through converter 260 may then transmit the telephone number to telecommunications line 250.

In a further exemplary embodiment of the present invention, velocity checking on dialed numbers may be implemented. Velocity checking may be used for detecting dialing of the same phone number (or portions thereof) in excess of a predetermined number of times over a certain time period. In response to velocity checking, the telecommunications device can be selectively disabled in order to prevent fraudulent telephone activity. Thus, for example, if a first signal stream and a second signal stream generated by one or more telephones within a certain time period correspond to the same phone number (or portions thereof) the telephone generating these signal streams can be selectively disabled. This may also apply to other numbers (e.g. calling card numbers) as set forth below.

In a further exemplary embodiment of the present invention, velocity checking on calling card numbers may be implemented. By isolating a calling card number in the dial digit stream (based upon the entered dialing sequence), multiple occurrences of a single calling card number (or portions thereof) may be determined. If this calling card number is found to be used in excess of a certain threshold over a certain time period, the telecommunications device may be disabled.

In the velocity checking operations described above, data compression (encryption) algorithms may be applied to entered phone numbers and calling card numbers and multiple levels of testing may be used in order to reduce the amount of memory storage required. For example, at a first level of testing, velocity checking based solely on area codes or international codes may be implemented. At a second level of testing, velocity checking on frequently used exchanges within frequently used area codes may be implemented. Furthermore, a second level of testing may be implemented in conjunction with the first level of testing. At a third level of testing, the last four digits of the most frequently used area codes and exchange combinations may be examined to determine specific ten digit numbers being dialed. In addition, the frequency of these calls may be determined. This allows the ability to pinpoint a few exact ten digit telephone numbers (out of approximately ten billion combinations) of high usage calls using a small subset of that amount of data storage memory (10 to 20 thousand variables).

Velocity checking may also be based on alternative groupings of entered digits, besides or in addition to those combinations of entered digits stated above. For example, a similar type of compression may be implemented for calling card numbers (or portions thereof) in accordance with practices which are well known to one skilled in the art.

The information which is gathered while conducting velocity checking as described above may be transmitted by the telecommunications device to a remote station. Thus, the telecommunications device could transmit statistical or detailed reports on phone activity for a given period of time.

Furthermore, a group of telephones may be networked so that their individual data is collected on a remote computer (not shown). At this remote computer, another level of velocity checking can be performed on the combined data. Such networking facilitates the detection of telephone fraud in which a group of perpetrators are placing fraudulent calls from several telephones which are in close physical proximity. Detection of the occurrence of this telephone fraud is thus facilitated.

Furthermore, in accordance with the velocity checking described above, signals can be transmitted to the telephones which are used for fraudulent activity. If these telephones are responsive to these signals, telephone calls which are placed using the detected numbers can be blocked or redirected as explained above.

Figure 3A:
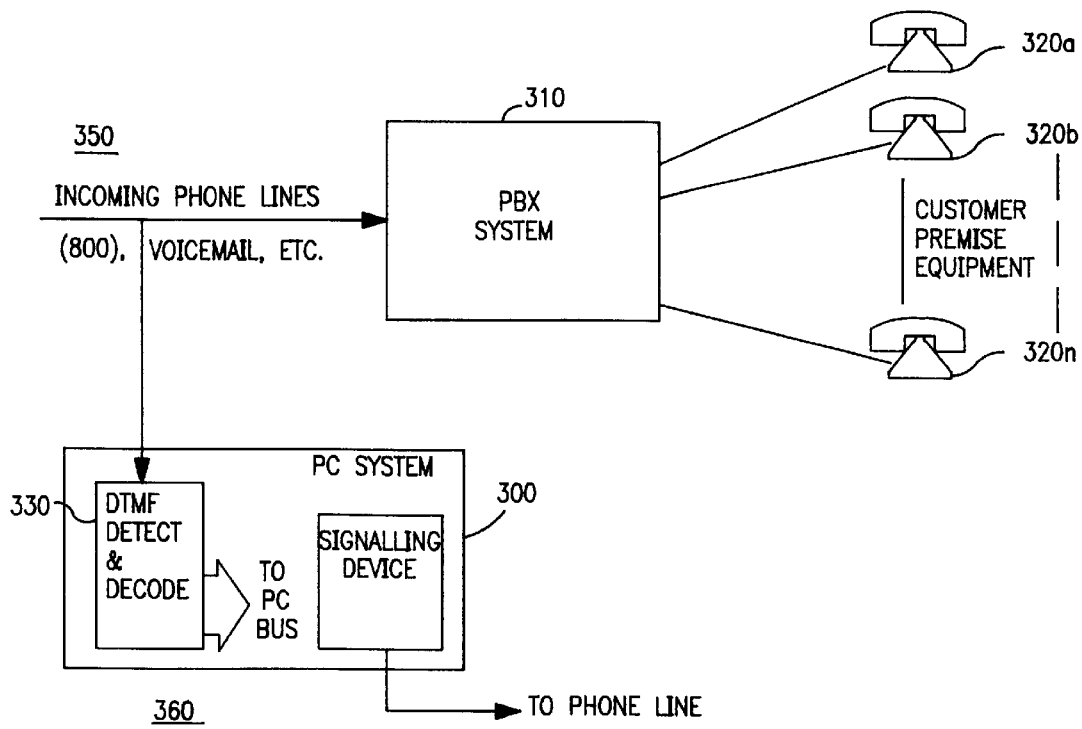
FIG. 3A is a block diagram which illustrates a sixth exemplary embodiment of the present invention.

A further exemplary embodiment of the present invention is illustrated by FIG. 3A. Telecommunications line 350 is connected to PBX System 310. PBX System 310 is connected to customer premise equipment 320A through 320N. PC System 360 is connected to telecommunication lines 350. PC System 360 includes DTMF detector 330 and signalling device 340. DTMF detector 330 converts DTMF signals received from telecommunication lines 350 into a plurality of signals which are transmitted to PC System 360. If PC System 360 determines (using velocity checking) that predetermined digits have been used in a plurality of dialing sequences at specific locations, a message may be sent to signalling device 340, by PC System 360 to indicate that potentially fraudulent activity is occurring. An appropriate individual (or appropriate automated devices) may then take further action, such as terminating the call, monitoring the call, etc.

Figure 3B:
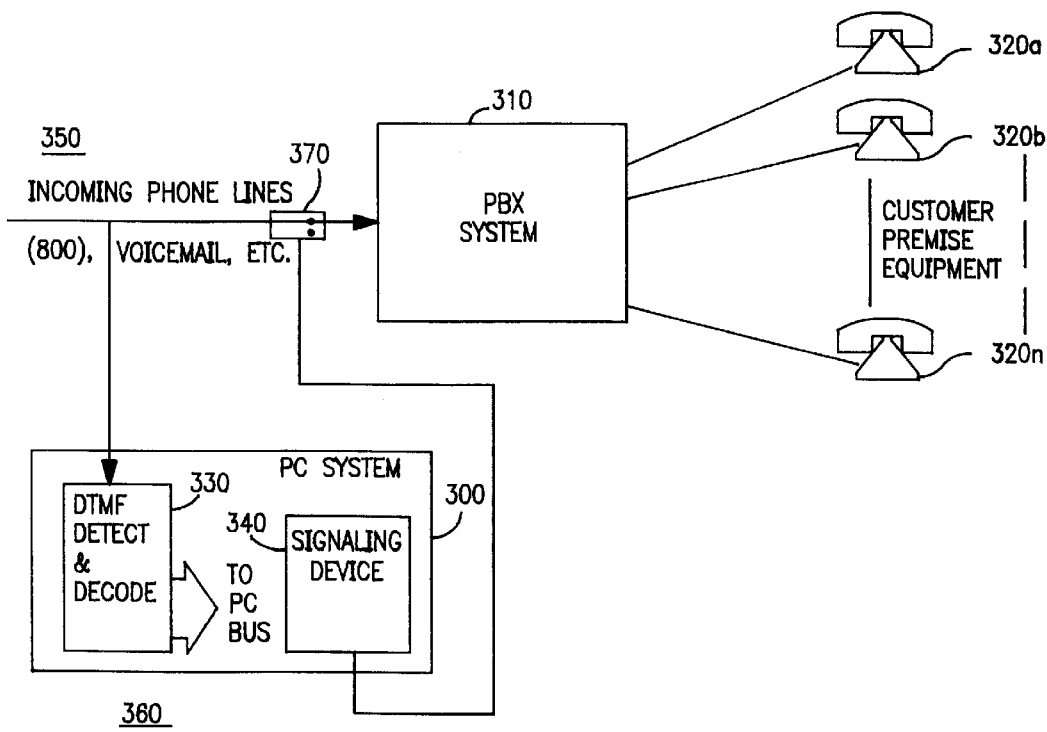
FIG. 3B is a block diagram which illustrates a seventh exemplary embodiment of the present invention.

In a further exemplary embodiment of the present invention which is illustrated by FIG. 3B, the output of signalling device 340 is transmitted to switch 370. Thus, upon the detection of predetermined digits at appropriate locations in the dialing sequence by PC System 360, the connection between the incoming phone line 350 and PBX System 310 is terminated. Thus, the telephone call is automatically terminated.

The embodiments of the present invention which are illustrated by FIG. 3A and FIG. 3B can also be used with a trunk type system. Thus, the fraudulent use of a PBX in multiplexed message environment can be effectively regulated.

In a further exemplary embodiment of the present invention, the output of signalling device 340 is connected directly (not shown) to PBX System 310. In this manner, PBX System 310 receives an appropriate signal which prevents use of the PBX System for placing the fraudulent call.

Figure 4A:
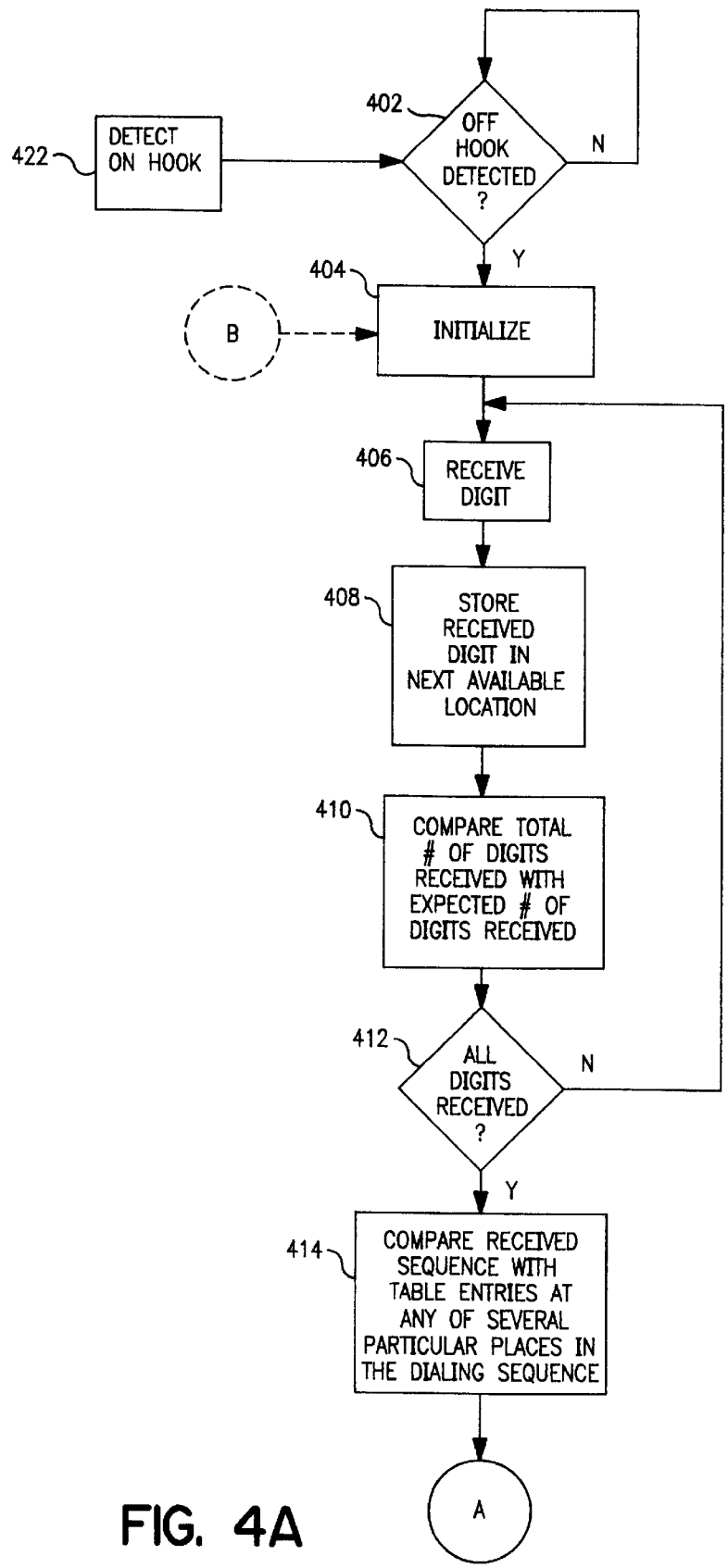
FIG. 4A is a portion flow chart diagram which illustrates the operation of an exemplary embodiment of the present invention.

A flow chart diagram which illustrates the operation of the present invention is shown in FIG. 4A. At step 402, microprocessor 130 waits for an off-hook condition. When an off-hook condition is detected, the appropriate software is initialized at step 404. At step 406, as the caller enters each digit into the telecommunications device, each digit is received. At step 408, each digit is stored at a next available location associated with microprocessor 130. At step 410, the total number of digits which have been received is compared with the expected number of received digits. The expected number of received digits is determined in accordance with national (i.e. United States) telecommunication dialing protocols by identifying the use of particular digits in the dialing sequence. Alternately, in place of step 410, processing may continue after a predetermined period of time has elapsed. At step 412, if all digits have not been received, execution of the computer software proceeds to step 406, at which point another digit entered by the user is processed. Otherwise, at step 414, the received sequence of digits is compared with table entries at any of several particular places in the dialing sequence such as those illustrated in Tables 1 and 2 above. Execution of the computer software then proceeds to step 416 via off-page connector A. If, at step 414, a match is determined, then at step 416, control continues to step 418 at which point the call is blocked. Alternately, at step 416, if no match is found, control continues to step 420 at which point a line is obtained and the entered digits are transmitted to the telephone line to initiate the call.

In an alternative embodiment of the present invention, after the call is blocked at step 418, control continues to step 404 at which point the computer software is initialized and a new sequence of digits may be entered. At any time, if an on-hook condition is detected (step 422), then, control is transferred to step 402.

Figure 4B:
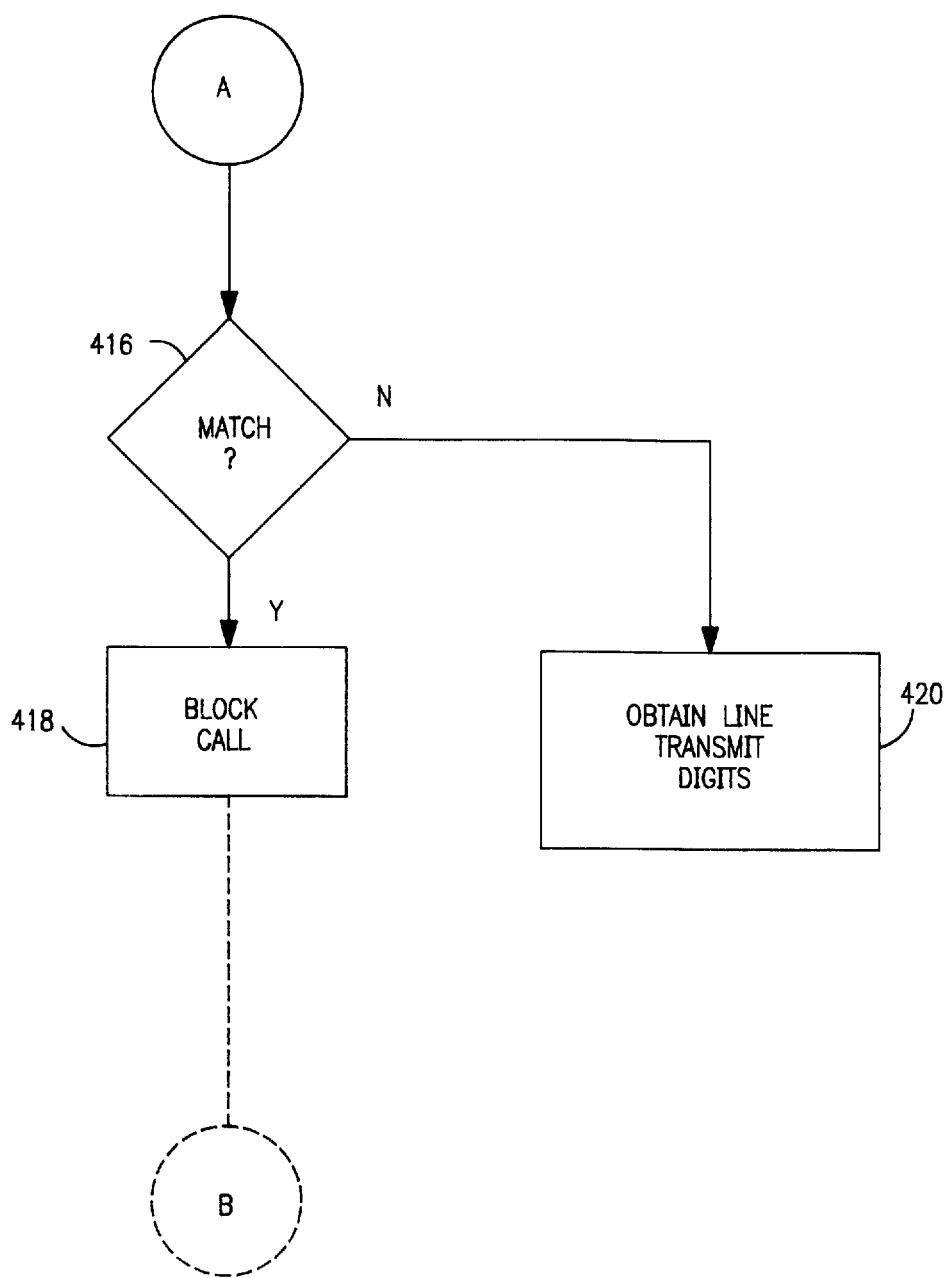
FIG. 4B is a further portion of the flow chart diagram of FIG. 4A which illustrates the operation of an exemplary embodiment of the present invention.

A further exemplary embodiment of the present invention is illustrated by FIG. 4B. At step 450, when an off-hook condition is detected, the computer software is initialized. At step 456, a line is obtained. At step 458, a dialing digit is received from the telephone user. This dialing digit is transmitted to the available line. At step 460, the received dialing digit is stored in a next available location associated with microprocessor 130. At step 456, the received digits are compared with a plurality of stored numbers at any of several particular places in the dialing sequence. At step 464, if a match is found, then, at step 466, the call is blocked. Alternately, if no match is found at step 464, execution of the computer software continues at step 458, at which point another dialing digit is received from the telephone user. If all dialing digits have been entered without determination of a match at step 464, the call is allowed to complete. If, at any time, an on-hook condition is detected (step 452), then processing automatically continues at step 450.

Figure 4C:
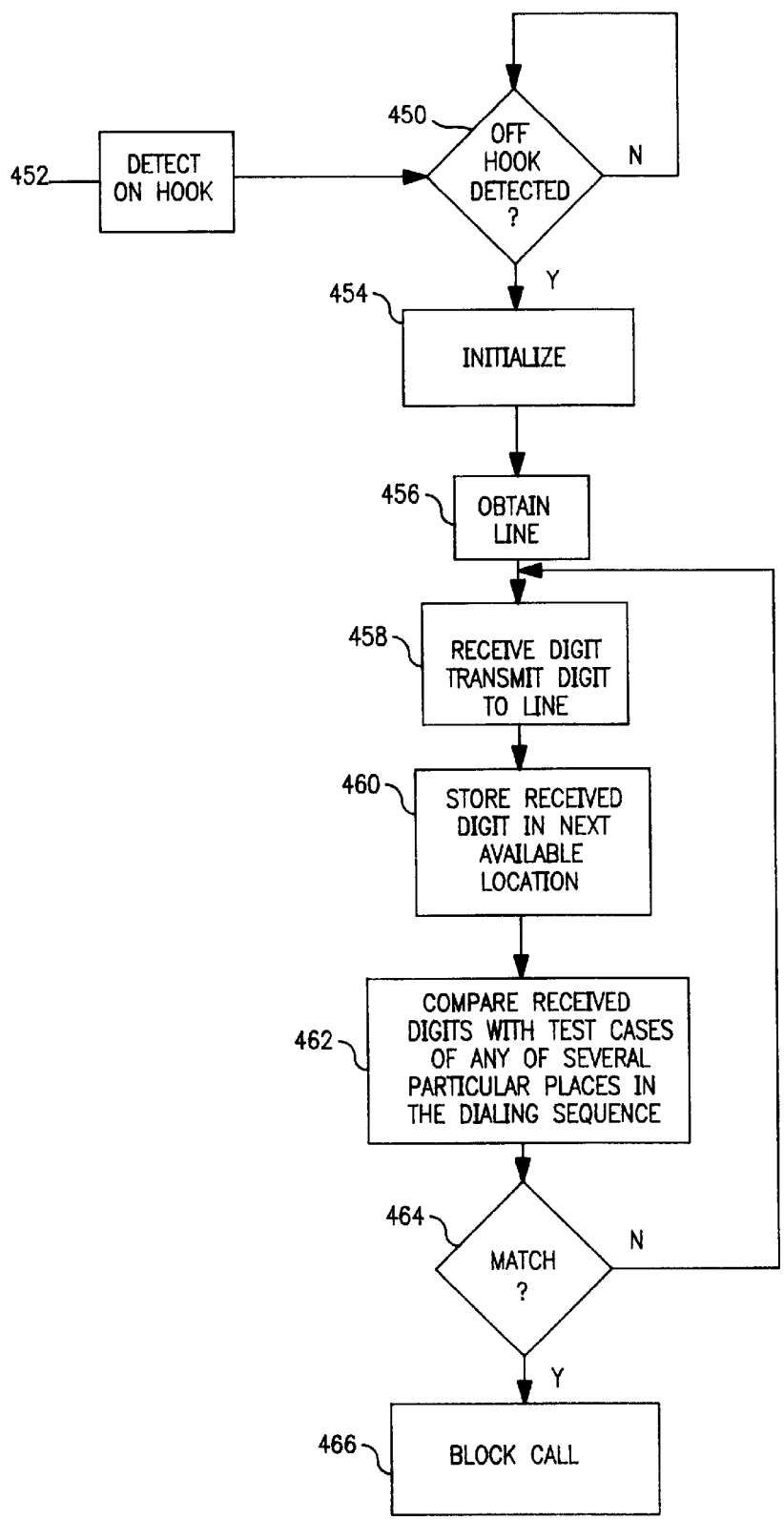
FIG. 4C is a flow chart diagram which illustrates the operation of a further exemplary embodiment of the present invention.

The exemplary embodiments of the present invention which are illustrated by FIGS. 4A, 4B and 4C may be slightly modified so that these algorithms may be used in accordance with the exemplary embodiments of the present invention which are illustrated by FIGS. 3A and 3B. By implementing these algorithms in conjunction with velocity checking, a signal can be transmitted which alerts an individual (or automated devices) that potentially fraudulent telephone calls are occurring. Furthermore, such a signal can be used for preventing the PBX from completing the call by opening a switch on a telecommunications line which is connected to the PBX, selectively disabling operation of a multiplexed trunk line or transmitting a separate signal to the PBX in order to disable at least a portion of the PBX.

In the above description, numerous references have been made to the blocking of a telephone call or the control of fraudulent activity. It is understood that any of a variety of methods may be used to prevent fraudulent use of the telecommunications device including, but not limited to, severing appropriate connections, muting the mouthpiece, disabling the digit entry device (i.e. the keypad), etc.

While the invention has been described in terms of an exemplary embodiment, it is contemplated that it may be practiced as outlined above with modifications within the spirit and scope of the appended claims.

What is claimed:

1. Telecommunications apparatus for selectively preventing establishment of a telephone call to a telephone number having a central office exchange code, said telecommunications apparatus being capable of transmitting a dialing sequence which includes a first plurality of dialing signals, followed by a second plurality of dialing signals followed by a third plurality of dialing signals, said telecommunications apparatus comprising:

means for receiving said dialing sequence prior to receiving said central office exchange code;

means for evaluating said third plurality of dialing signals and for preventing establishment of said telephone call if said evaluated third plurality of dialing signals are determined to a) be in a location in said dialing sequence to accomplish international dialing and b) be respective predetermined signals which are used for international dialing irrespective of said second plurality of dialing signals.

2. Telecommunications apparatus according to claim 1, wherein said signals which are used for international dialing correspond to a "01" dialing sequence.

3. Telecommunications apparatus according to claim 1, wherein said means for evaluating said third plurality of dialing signals includes means for evaluating said first plurality of dialing signals and for preventing establishment of said telephone call if said evaluated first plurality of dialing signals are determined to be further respective predetermined signals.

4. Telecommunications apparatus according to claim 1, wherein said location in said dialing sequence to accomplish international dialing is an earliest location within said dialing sequence which indicates that said dialing sequence is for accomplishing international dialing.

5. Telecommunications apparatus according to claim 1, wherein said means for evaluating said third plurality of dialing signals identifies said first plurality of dialing digits and said second plurality of dialing digits in order to identify said third plurality of dialing digits.

6. Telecommunications apparatus according to claim 1, wherein said respective predetermined signals which are used for international dialing are one of a) an international access code and b) an international area code.

7. Telecommunications apparatus according to claim 5, wherein said means for evaluating said third plurality of dialing signals selectively prevents establishment of said telephone call by preventing said telecommunications apparatus from transmitting at least a portion of said dialing sequence.

8. Telecommunications apparatus for selectively enabling establishment of a telephone call to a telephone number having a central office exchange code via a communications pathway, said telecommunications apparatus being capable of transmitting a dialing sequence which includes a first plurality of dialing signals followed by a second plurality of dialing signals followed by a third plurality of dialing signals, said telecommunications apparatus comprising:

means for receiving said dialing sequence prior to receiving said central office exchange code;

means for evaluating said third plurality of dialing signals in a location in said dialing sequence used for international dialing by determining if said third plurality of dialing signals are used to accomplish international dialing;

means for transmitting said dialing sequence to said communications pathway if said evaluated third plurality of dialing signals are determined to not be predetermined signals which are used to accomplish international dialing irrespective of said second plurality of dialing signals.

9. Telecommunication apparatus according to claim 8, wherein said predetermined signals correspond to a "01" dialing sequence.

10. Telecommunications apparatus according to claim 8, wherein said means for transmitting said dialing sequence to said communications pathway transmits said dialing sequence to said communications pathway if said first plurality of dialing signals are determined to not be further predetermined signals.

11. Telecommunications apparatus according to claim 8, wherein said location in said dialing sequence to accomplish international dialing is an earliest location within said dialing sequence which indicates that said dialing sequence is for accomplishing international dialing.

12. Telecommunications apparatus according to claim 8, wherein said means for evaluating said third plurality of dialing signals identifies said first plurality of dialing digits and said second plurality of dialing digits in order to identify said third plurality of dialing digits.

13. Telecommunications apparatus according to claim 8, wherein said respective predetermined signals which are used for international dialing are one of a) an international access code and b) an international area code.

14. Telecommunications apparatus according to claim 12, further comprising means for preventing said telecommunications apparatus from transmitting at least a portion of said dialing sequence to said communications pathway.

15. Telecommunications apparatus for preventing establishment of a telephone call to a telephone number having a central office exchange code which occurs over a communications pathway, said telecommunications apparatus being capable of transmitting a dialing sequence corresponding to said telephone number which includes a first signal value, a plurality of second signal values, and a plurality of further signal values interposed between said first signal value and said plurality of second signal values, said telecommunications apparatus comprising:

means for transmitting said first signal value, said plurality of second signal values and said plurality of further signal values to said communications pathway prior to transmitting signal values corresponding to said central office exchange code;

means for evaluating said plurality of second signal values and for preventing establishment of said telephone call if said plurality of second signal values are determined to a) be in a location in said dialing sequence to accomplish international dialing and b) be used to accomplish international calling irrespective of said plurality of further signal values.

16. Telecommunications apparatus according to claim 15, wherein establishment said telephone call is prevented if said plurality of second signal values correspond to a "01" dialing sequence.

17. Telecommunications apparatus according to claim 15, wherein said means for evaluating said plurality of second signal values further includes means for evaluating said first signal value and for preventing establishment of said telephone call if said first signal value at a predetermined location in said sequence is determined to be a predetermined signal value.

18. Telecommunications apparatus according to claim 15, wherein said location in said dialing sequence to accomplish international dialing is an earliest location within said dialing sequence which indicates that said dialing sequence is for accomplishing international dialing.

19. Telecommunications apparatus according to claim 15, wherein said means for evaluating said plurality of second signal values identifies said first signal value and said plurality of further signal values in order to identify said plurality of second signal values.

20. Telecommunications apparatus according to claim 15, wherein said plurality of second signal values are determined to be used to accomplish international dialing if said plurality of second signal values are one of a) an international access code and b) an international area code.

21. Telecommunications apparatus according to claim 19, wherein said means for evaluating said plurality of second signal values prevents establishment of said telephone call by preventing said telecommunications apparatus from transmitting at least a portion of said dialing sequence.

22. A method for at least partially preventing operation of a telecommunications device which is capable of transmitting a plurality of signal values, said method comprising the steps of:

a) receiving said plurality of signal values;

b) comparing at least two of said plurality of signal values respectively located at predetermined locations used for international dialing with respective predetermined digit sequences which are used for international dialing and comparing a further signal value located at a further predetermined location with a further predetermined signal value, wherein a plurality of further signal values are located between said at least two of said plurality of signal values and said further signal value; and c) at least partially preventing operation of said telecommunications device irrespective of said plurality of further signal values if said at least two of said plurality of signal values and any one of said respective predetermined digit sequences are found to be identical in step b) and if said further predetermined signal value is found to be identical to said further signal value.

23. The method of claim 22, wherein said digit sequences include a "01" dialing sequence.

24. A method according to claim 22, wherein said predetermined locations used for international dialing are earliest locations within said plurality of signal values which indicates that said plurality of signal values are for accomplishing international dialing.

25. A method according to claim 22, further comprising the step of identifying said further signal value and said plurality of further signal values in order to identify said at least two of said plurality of signal values.

26. A method apparatus according to claim 22, wherein said respective predetermined signals which are used for international dialing are one of a) an international access code and b) an international area code.

27. The method of claim 22, wherein each of said plurality of signal values corresponds to one of the characters 1, 2, 3, 4, 5, 6, 7, 8, 9, 0, # and *.

28. The method of claim 22, wherein said telecommunications device is coupled to a telecommunications pathway and wherein operation of said telecommunications device is at least partially prevented by severing a connection between said telecommunications device and said telecommunications pathway.

29. A method of controlling the operation of a telecommunications device being capable of transmitting a dialing sequence which includes a first plurality of dialing signals, followed by a second plurality of dialing signals followed by a third plurality of dialing signals prior to transmitting a central office exchange, said method comprising the steps of:

a) receiving said dialing sequence;
   b) evaluating said third plurality of dialing signals;
   c) at least partially preventing operation of said telecommunications device irrespective of said second plurality of dialing signals if said evaluated third plurality of dialing signals are determined to a) be in location in said dialing sequence to accomplish international dialing and b) be (a one of a plurality of respectively predetermined digit sequences which are used for international dialing; and
   d) transmitting said dialing sequence to said communications pathway if said evaluated third plurality of dialing signals is not determined to be any one of said plurality of respectively predetermined digit sequences which is used for international dialing.

30. The method of claim 29, wherein said predetermined digit sequences include a "01" dialing sequence.

31. A method of controlling the operation of a telecommunications device according to claim 29, wherein step (b) further includes the step of evaluating said first plurality of dialing signals and step (c) includes the step of at least partially preventing operation of said telecommunications device if said evaluated first plurality of dialing signals are determined to be a further respectively predetermined digit sequence.

32. A method according to claim 29, wherein said location in said dialing sequence to accomplish international dialing is an earliest location within said dialing sequence which indicates that said dialing sequence is for accomplishing international dialing.

33. A method according to claim 29, further comprising the step of identifying said first plurality of dialing signals and said second plurality of dialing signals in order to identify said third plurality of dialing signals.

34. A method according to claim 29, wherein said plurality of respectively predetermined digit sequences which are used for international dialing are one of a) an international access code and b) an international area code.

35. A method for at least partially preventing use of a telecommunications device, comprising the steps of:

a) receiving a plurality of signal values which are entered into said telecommunications device, wherein said plurality of signal values include a first group of signal values followed by a second group of signal values followed by a third group of signal values;
   b) comparing said received third group of signal values with a plurality of first test signal value sequences which are used for international dialing; and
   c) at least partially preventing use of said telecommunications device if said third group of signal values is a) in a location within said plurality of signal values which is used to accomplish international dialing and b) found to be identical to said plurality of first test signal value sequences irrespective of said second group of signal values.

36. The method of claim 35, wherein each of said signal values corresponds to one of the characters 1, 2, 3, 4, 5, 6, 7, 8, 9, 0, # and *.

37. The method of claim 35, wherein said telecommunications device is coupled to a telecommunications pathway and wherein operation of said telecommunications device is at least partially prevented by severing a connection between said telecommunications device and said telecommunications pathway.

38. A method for at least partially preventing use of a telecommunications device according to claim 35, wherein step (b) includes the step of comparing said received first group of signal values with a plurality of second test signal value sequences and step (c) includes the step of at least partially preventing use of said telecommunications device if said first group of signal values is found to be identical to said plurality of second test signal value sequences.

39. A method according to claim 35, wherein said location within said plurality of signal values which is used to accomplish international dialing is an earliest location within said plurality of signal values which indicates that said plurality of signal values is for accomplishing international dialing.

40. A method according to claim 35, further comprising the step of identifying said first group of signal values and said second group of signal values in order to identify said third group of signal values.

41. A method according to claim 35, wherein said plurality of first test signal value sequences which are used for international dialing are one of a) an international access code and b) an international area code.

42. Apparatus, for use with a telecommunications device, for selectively preventing communications between said telecommunications device and a further telecommunications device, said apparatus comprising:

means for interposing said apparatus between said telecommunications device and said further telecommunications device;
   means for receiving a plurality of signals which are transmitted from said telecommunications device prior to said telecommunications device transmitting a further plurality of signals corresponding to a central office exchange code, said plurality of signals comprising a first plurality of signals, followed by a second plurality of signals, followed by a third plurality of signals;
   prevention means for selectively preventing communications between said telecommunications device and said further telecommunications device if said third plurality of signals are determined to a) be in a location within said plurality of signals which is used for accomplishing international dialing and b) include ones of a plurality of test signals which are used for accomplishing international dialing irrespective of said second plurality of signals.

43. The apparatus of claim 42, wherein each of said signals corresponds to one of the characters 1, 2, 3, 4, 5, 6, 7, 8, 9, 0, # and *.

44. The apparatus of claim 42, wherein said said telecommunications device is coupled to a telecommunications pathway and wherein said prevention means includes means for severing a connection between said telecommunications device and said telecommunications pathway.

45. The apparatus of claim 42, wherein said plurality of test signals corresponds to digit sequence 01.

46. Apparatus according to claim 42, wherein said plurality of test signals corresponds to a "01" dialing sequence.

47. Apparatus according to claim 42, wherein said prevention means selectively prevents communications between said telecommunications device and said further telecommunications device if said third plurality of signals are determined to be at an earliest location within said plurality of signals which indicates that said plurality of signals are for accomplishing international dialing.

48. Apparatus according to claim 42, wherein said prevention means identifies said first plurality of signals and said second plurality of signals in order to identify said third plurality of signals.

49. Apparatus according to claim 42, wherein said second plurality of test signals which are used for accomplishing international dialing are one of a) an international access code and b) an international area code.

* * * * *